(12) United States Patent
Feuerle et al.

(10) Patent No.: US 10,408,990 B2
(45) Date of Patent: Sep. 10, 2019

(54) LUMINAIRE FOR GENERATING DIRECT LIGHTING AND INDIRECT LIGHTING

(71) Applicant: ZUMTOBEL LIGHTING GMBH, Dornbirn (AT)

(72) Inventors: Helmut Feuerle, Sulzberg (AT); Marcel Kilga, Goetzis (AT); Michael Spiegel, Dornbirn (AT); Andreas Schwaighofer, Dornbirn (AT)

(73) Assignee: ZUMTOBEL LIGHTING GMBH, Dornbirn (AT)

( * ) Notice: Subject to any disclaimer, the term of this patent is extended or adjusted under 35 U.S.C. 154(b) by 22 days.

(21) Appl. No.: 14/783,856

(22) PCT Filed: Apr. 16, 2014

(86) PCT No.: PCT/EP2014/057778
§ 371 (c)(1),
(2) Date: Oct. 10, 2015

(87) PCT Pub. No.: WO2014/173769
PCT Pub. Date: Oct. 30, 2014

(65) Prior Publication Data
US 2016/0062030 A1 Mar. 3, 2016

(30) Foreign Application Priority Data
Apr. 24, 2013 (DE) .................... 20 2013 101 772 U

(51) Int. Cl.
*F21V 8/00* (2006.01)
*F21V 7/00* (2006.01)

(52) U.S. Cl.
CPC .......... *G02B 6/0063* (2013.01); *F21V 7/0016* (2013.01); *G02B 6/0038* (2013.01);
(Continued)

(58) Field of Classification Search
CPC .. G02B 6/0036; G02B 6/0038; G02B 6/0055; G02B 6/0058; G02B 6/0063; F21V 7/0016
See application file for complete search history.

(56) References Cited

U.S. PATENT DOCUMENTS

| 5,786,665 | A  | * | 7/1998 | Ohtsuki | ............... | G02B 6/0021 313/113 |
| 6,679,613 | B2 | * | 1/2004 | Mabuchi | .............. | G02B 6/0038 349/63 |

(Continued)

FOREIGN PATENT DOCUMENTS

| CN | 1532591 | 9/2004 |
| CN | 102797994 | 11/2012 |

(Continued)

OTHER PUBLICATIONS

International Search Report for PCT/EP2014/057778, English translation attached to original, Both completed by the European Patent Office on Jun. 27, 2014, All together 5 Pages.

(Continued)

*Primary Examiner* — Alexander K Garlen
(74) *Attorney, Agent, or Firm* — Volpe and Koenig, P.C.

(57) ABSTRACT

A luminaire for generating direct lighting and indirect lighting including an LED light source for generating light and a light guide plate having a first main surface and a second main surface, which is connected to the first main surface marginally via a narrow side face, wherein the LED light source is arranged in such a way that the light is radiated into the light guide plate via the narrow side face and subsequently one part of the light is emitted for generating the direct lighting via the first large main surface. Furthermore, a reflector is provided, which is arranged adjacent to the second main surface, wherein the reflector has at least one light-transmissive region configured in such a way that a (Continued)

Figure 1:
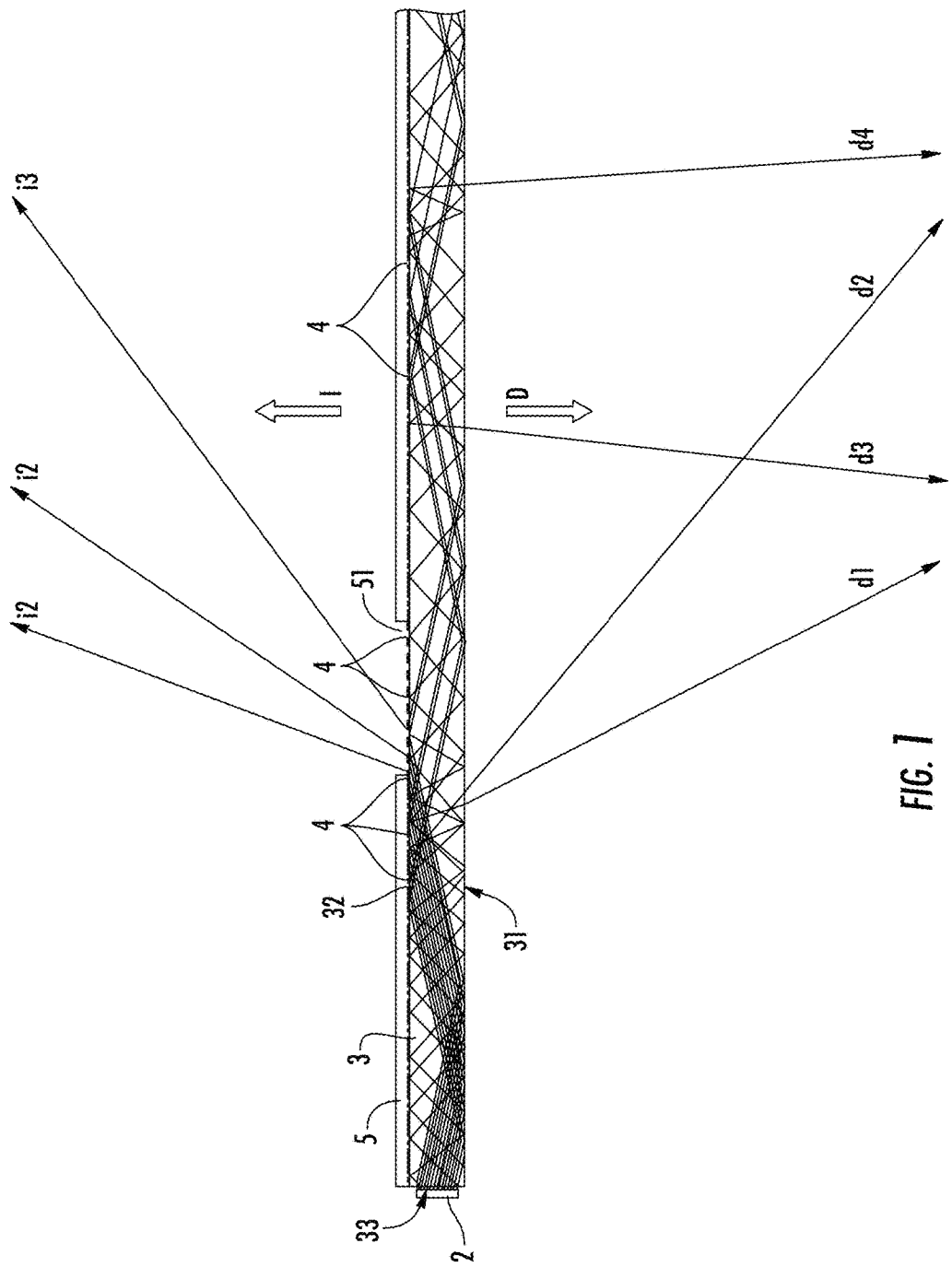

further part of the light is emitted for generating the indirect lighting via the second main surface through the light-transmissive region.

11 Claims, 6 Drawing Sheets

(52) U.S. Cl.
CPC .......... *G02B 6/0055* (2013.01); *G02B 6/0036* (2013.01); *G02B 6/0058* (2013.01)

(56) References Cited

U.S. PATENT DOCUMENTS

| | | |
|---|---|---|
| 8,231,259 B2 | 7/2012 | Keller et al. |
| 8,585,237 B2 | 11/2013 | Kim et al. |
| 2004/0239832 A1 | 12/2004 | Saito |
| 2006/0146238 A1 | 7/2006 | Lin et al. |
| 2010/0214804 A1 | 8/2010 | Shigeta et al. |
| 2012/0113679 A1* | 5/2012 | Boonekamp ......... G02B 6/0068 362/607 |
| 2012/0127756 A1* | 5/2012 | Kim .................... G02B 6/0055 362/612 |

FOREIGN PATENT DOCUMENTS

| | | |
|---|---|---|
| DE | 102008014317 | 9/2009 |
| DE | 102009001170 | 9/2010 |
| EP | 2527725 | 11/2012 |

OTHER PUBLICATIONS

Chinese Office Action for Chinese Application No. CN 201480021386.2, dated Jan. 19, 2018, 8 Pages.

* cited by examiner

LUMINAIRE FOR GENERATING DIRECT LIGHTING AND INDIRECT LIGHTING

CROSS-REFERENCE TO RELATED APPLICATION

This application is the U.S. national phase of PCT Application No. PCT/EP2014/057778 filed on Apr. 16, 2014, which claims priority to DE Patent Application No. 20 2013 101 772.8 filed on Apr. 24, 2013, the disclosures of which are incorporated in their entirety by reference herein.

The invention relates to a luminaire for producing direct lighting and indirect lighting that has an LED light source and a light guide plate.

Such a luminaire is known from DE 10 2008 014 317 A1. In this luminaire, the light guide plate is oriented horizontally, with the light from the LED light source being radiated into the light guide plate via a narrow lateral face of the edge and subsequently being emitted via the downwardly pointing main surface of the light guide plate. In order to produce the indirect lighting, the luminaire has two illuminants that are arranged at the side next to the LED light source and the light guide plate. This is associated with corresponding outlay and corresponding costs.

The invention is based on the object of specifying a corresponding improved luminaire. In particular, the luminaire is intended to allow an altogether simple design given low physical height and to require no separate light source for producing the indirect lighting.

This object is achieved in accordance with the invention by the subject matter cited in the independent claim. Particular embodiments of the invention are specified in the dependent claims.

The invention provides a luminaire for producing direct lighting and indirect lighting having an LED light source for producing a light and a light guide plate having a first main surface and a second main surface, which is connected to the first main surface at the edge via a narrow lateral face, wherein the LED light source is arranged such that the light is radiated into the light guide plate via the narrow lateral face and subsequently a portion of said light is emitted via the first large main surface in order to produce the direct lighting. In addition, the luminaire has a reflector that is arranged adjoining the second main surface. In this case, the reflector has at least one transparent region that is designed such that a further portion of the light is emitted through the transparent region via the second main surface in order to produce the indirect lighting.

Since the reflector has a transparent region, the light produced by the LED light source can advantageously be used both for producing the direct lighting and for producing the indirect lighting. This allows a separate light source for producing the indirect lighting to be dispensed with. Furthermore, an appropriate choice for the size of the transparent region in this case provides the opportunity to adjust the proportion of the light that is used for producing the indirect lighting in the total light emitted by the luminaire with more or less arbitrary accuracy. Hence, the luminaire can be used to attain a particular desired ratio of indirect lighting to direct lighting very precisely.

Preferably, the transparent region is formed by a through-opening in a reflector. This allows the transparent region to be embodied in a manner that is particularly simple and advantageous for manufacture.

Preferably, the reflector is plate-shaped and is arranged plane parallel to the light guide plate. This embodiment allows the luminaire to be fashioned with a particularly low physical height given high efficiency.

Preferably, the light guide plate has structure elements on the second main surface for coupling out the light via the first main surface. This allows the coupling-out of the light via the first main surface to be fashioned particularly efficiently and set correctly. With further preference, the structure elements are fashioned differently within a surface region of the second main surface that is bounded by a normal projection of the transparent region of the reflector than in immediate surroundings of this surface region. As a result, it is possible for the light emitted via the first main surface to be emitted particularly homogeneously. The particular effect that can be issued by this is that when viewing the first main surface it is not possible to identify any dark point or inhomogeneity caused by the transparent region, or such dark point or inhomogeneity is at least markedly reduced.

Preferably, to this end, in a manner that is advantageous in terms of manufacture, the structure elements have a greater density within the surface region than in immediate surroundings.

Preferably, the structure elements within the surface region are fashioned such that this prompts that portion of the light that is emitted via the first main surface in order to produce the direct lighting to be emitted homogeneously within a normal projection of the surface region and the immediate surroundings. This is advantageous with reference to the outer appearance of the luminaire and with reference to particularly homogeneous light emission.

Preferably, the luminaire has a plurality of pairs comprising, in each case, a similarly fashioned transparent region of the reflector and an accordingly corresponding, similarly fashioned surface region of the first main surface. As a result, it is possible for the light for producing the indirect lighting to be emitted in a manner uniformly distributed over the second main surface.

Preferably, the structure elements are fashioned on the basis of their distance from the LED light source, particularly are fashioned more densely as distance increases. As a result, it is possible for the light emission considered over the entire first main surface to be particularly homogeneous, particularly not to decrease in intensity as distance from the LED light source increases.

Preferably, the structure elements are formed by engravings, particularly by means of laser treatment. This is advantageous in terms of manufacture and allows the structure elements and hence also the effect thereof to be fashioned particularly precisely.

Preferably, the structure elements are formed by linear elements; this is particularly simple to implement in terms of manufacture. Advantageously, the linear elements can have a width of between 0.2 mm and 1.5 mm, particularly of between 0.6 mm and 1.0 mm, for example 0.8 mm. These values have been found to be particularly suitable.

Preferably, the transparent region has a diameter of between 5 and 50 mm.

The luminaire is particularly suitable if it is embodied in the form of a suspended luminaire or floor luminaire.

Preferably, the luminaire is fashioned such that the ratio between the luminous flux that is formed by the luminaire as a result of the further portion of the light for producing the indirect lighting and the total luininous flux, which is formed by the total light emitted by the luminaire, is greater than 4%, preferably is greater than 10%.

Figure 2:
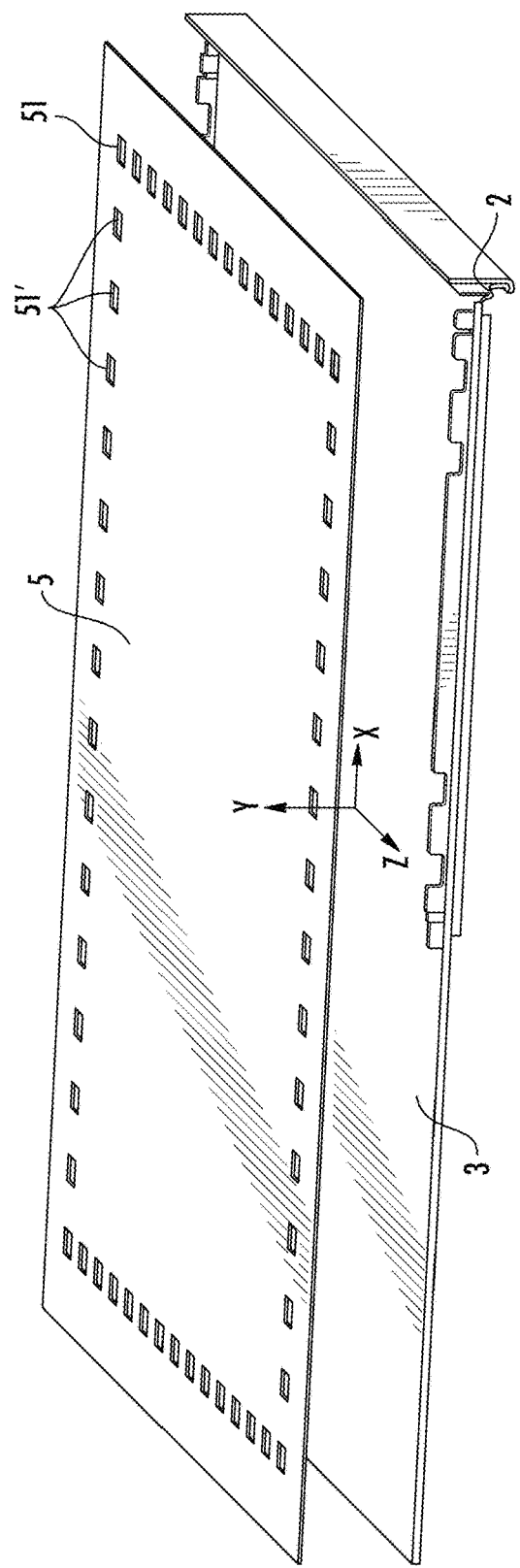
Figure 3:
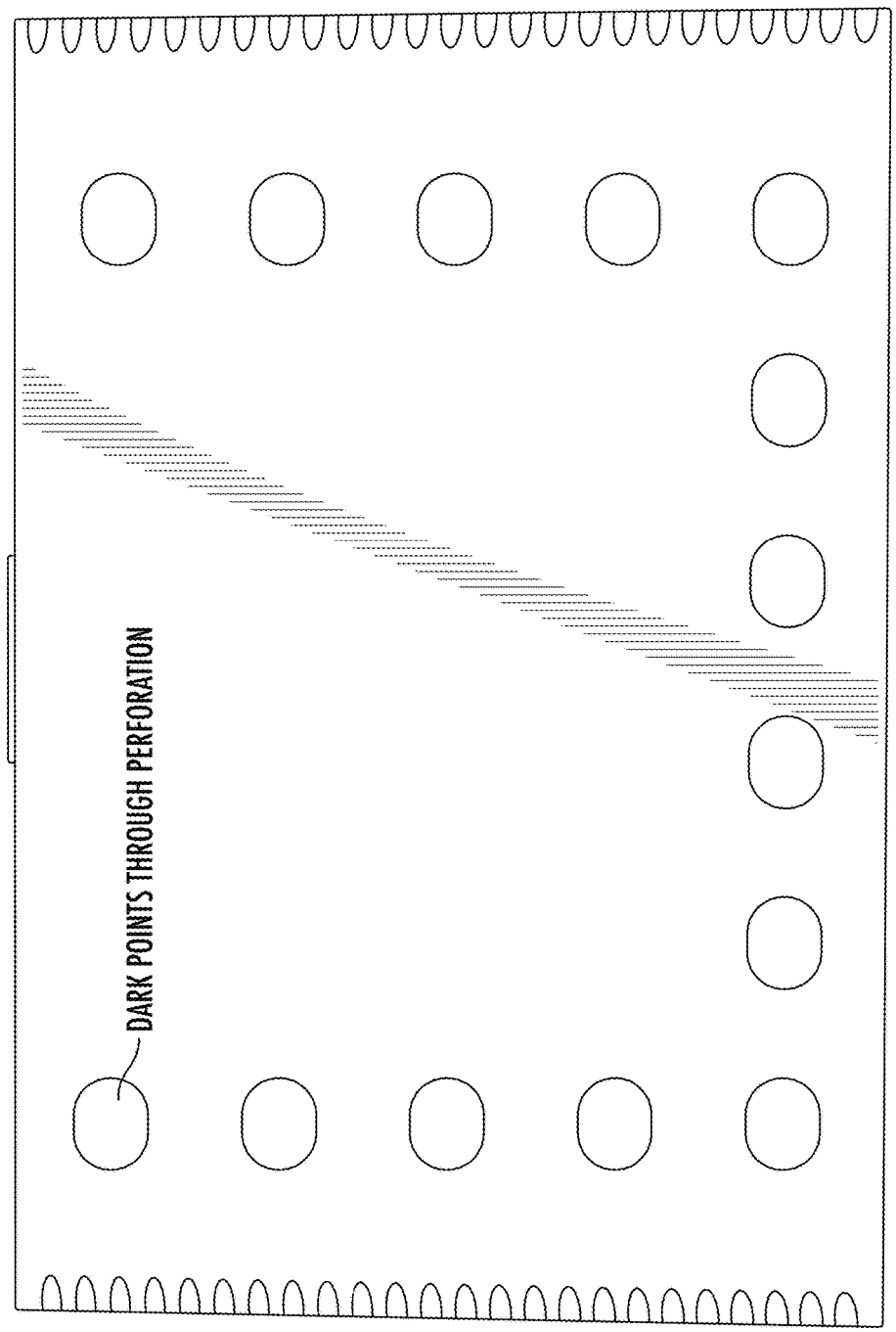
Figure 4:
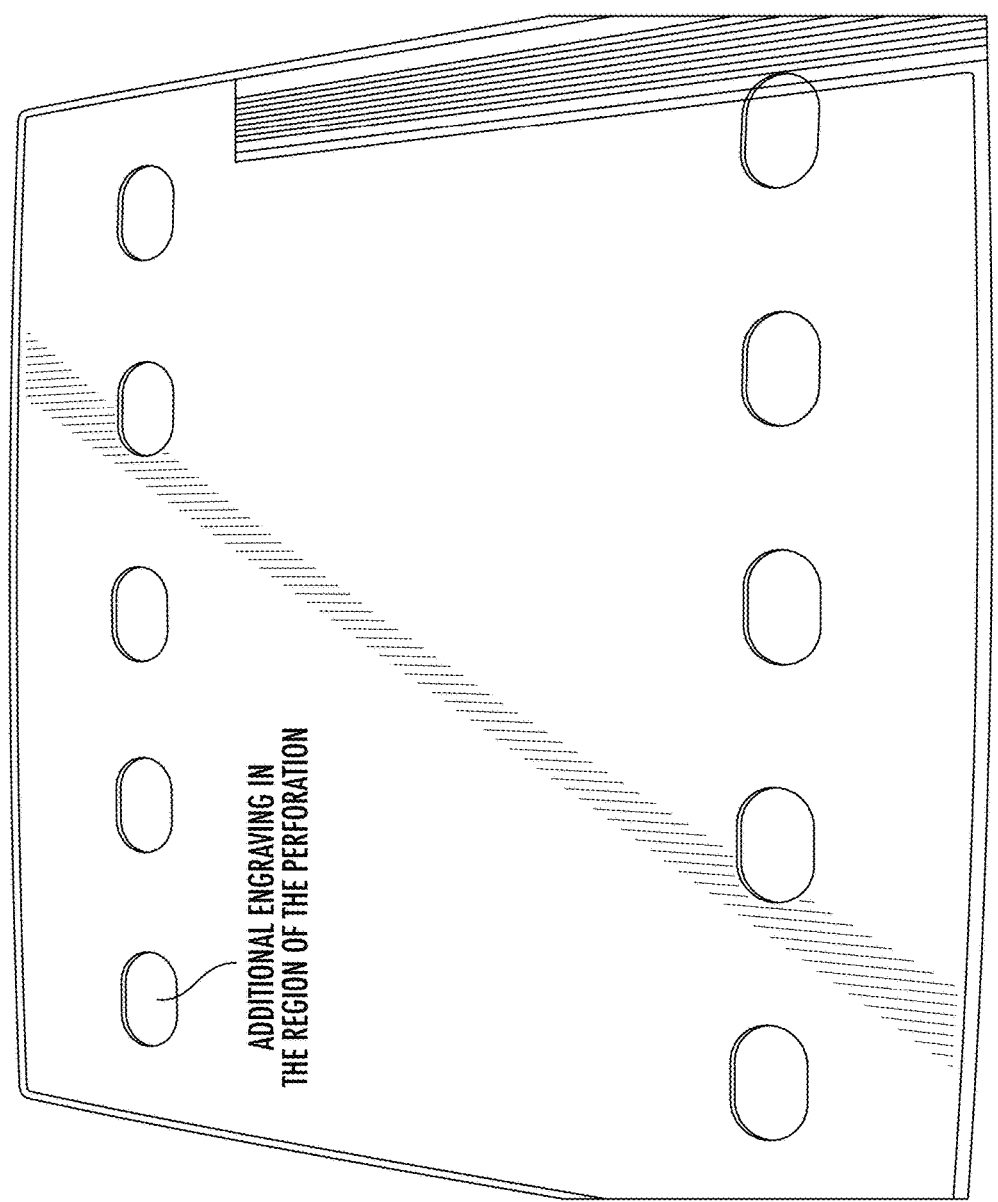
Figure 5:
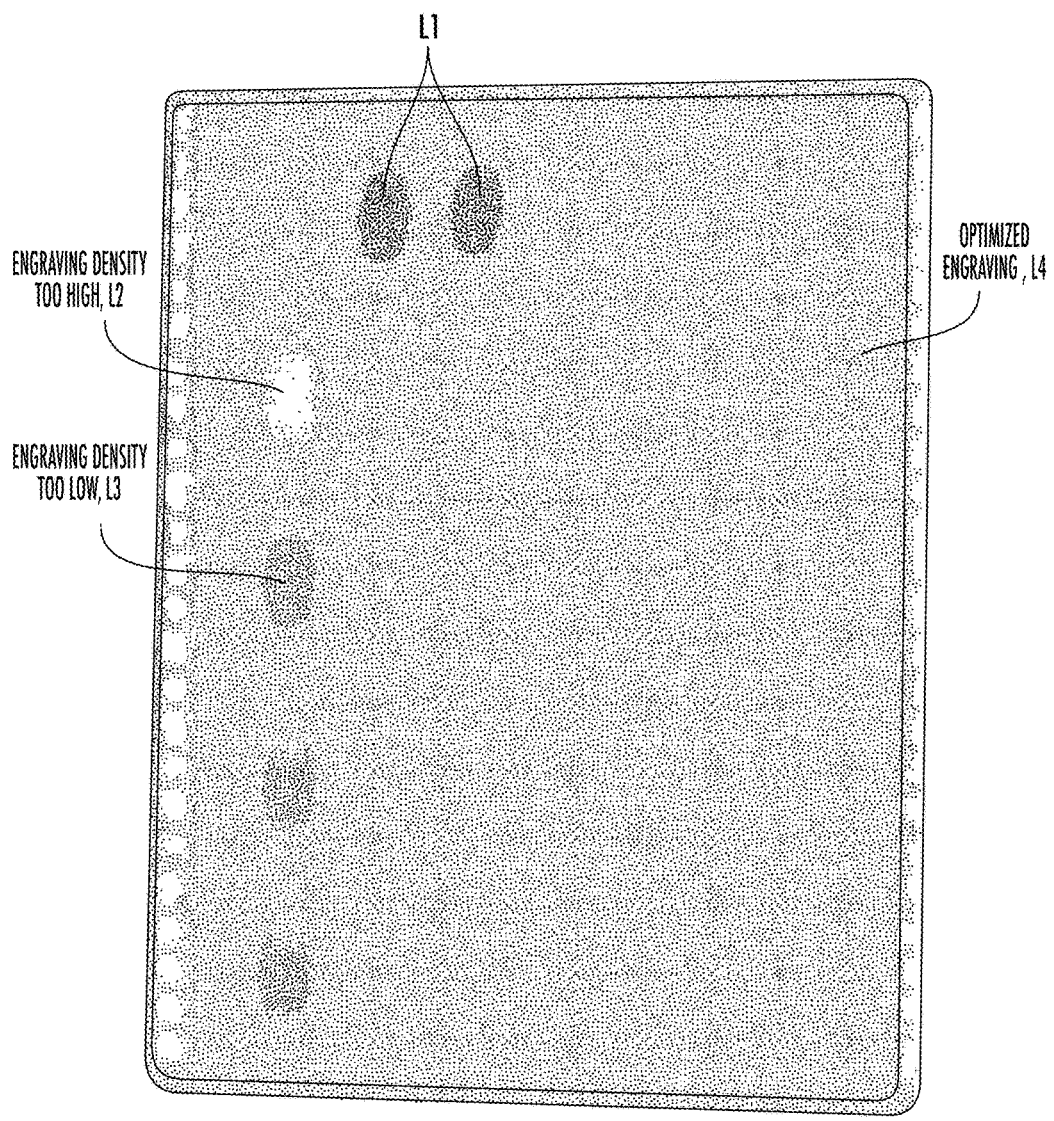
Figure 6:
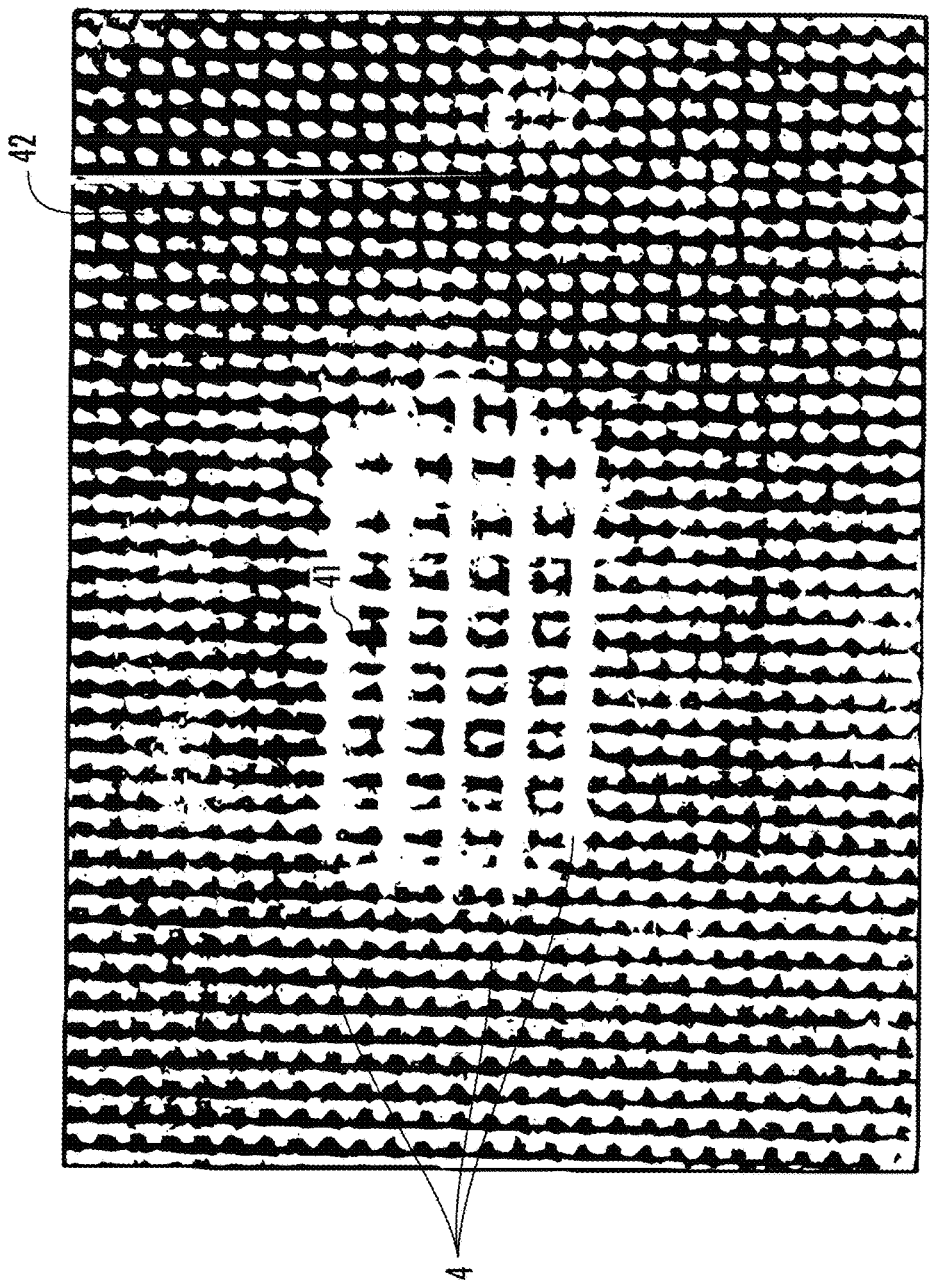

The invention is explained in more detail below using an exemplary embodiment and with reference to the drawings, in which:

FIG. 1 shows a basic outline in the style of a cross section for the luminous design of a luminaire according to the invention, FIG. 2 shows a perspective outline of the components LED light source, light guide plate and reflector according to an exemplary embodiment, the reflector being separate from the other two components, FIG. 3 shows a view of the first main surface of the light guide plate in an instance without special embodiment of the structure elements in the region of the through-openings in the reflector, FIG. 4 shows a view of the first main surface of the light guide plate in an instance with special embodiment of the structure elements in the region of the through-openings in the reflector, FIG. 5 shows a view of the first main surface of the light guide plate in an instance in which the structure elements have no special embodiment in the case of two through-openings, the structure elements have an excessively high engraving density in the case of a third through-hole, the structure elements have an excessively low engraving density in the case of a fourth through-hole and the structure elements have a particularly suitable engraving density in the case of a fifth through-hole, so that the location of this fifth through-hole is practically unidentifiable when viewing the first main surface, and FIG. 6 shows an example of an embodiment of the structure elements in the region of a through-hole and the immediate surroundings thereof.

FIG. 1 shows a basic outline in the style of a cross section for the luminous design of a luminaire according to the invention for producing direct lighting D and indirect lighting I. The luminaire has an LED light source 2 for producing a light and has a light guide plate 3. These two components 2, 3 can be arranged in a manner that is known per se, for example in a manner held by means of a frame element. Further components, such as power supply means of the LED light source 2, are not shown in the figure for the sake of clarity. It can be provided as is known per se from the prior art.

Said design means that the luminaire may particularly be a luminaire that is formed altogether in two dimensions. In this case, the luminaire can have a particularly low physical height.

By way of example, the LED light source 2 can have an elongate board that, with reference to the illustration in FIG. 1, has its longitudinal axis oriented normally to the plane of the drawing and on which, particularly along a straight line, a plurality of LEDs that produce the light are arranged.

The light guide plate 3 has a first main surface 31 and a second main surface 32, the second main surface 32 being connected to the first main surface 31 at the edge via a narrow lateral face 33. In the present description, it is assumed that the light guide plate is oriented horizontally such that the first main surface 31 points downward and the second main surface 32 upward. This serves merely for description and in this respect is not a limitation. Said orientation is particularly suitable, by way of example, when the luminaire is a suspended luminaire, however; in this case, the direct lighting D is provided in the lower half-space and the indirect lighting I upward.

The LED light source 2 is arranged such that the light is radiated or coupled into the light guide plate 3 via the narrow lateral face 33. In this respect, a design based on what is known as the "sidelit light guide concept" is involved. Subsequently, a portion of the light for producing the direct lighting D is then emitted via the first large main surface 31, as indicated schematically in FIG. 2 using four exemplary light beams d1, d2, d3, d4.

The example shown illustrates input radiation from one side; however, it is generally possible for the light to be radiated into the light guide plate 3 via a plurality of sides, that is to say via two opposite sides, for example.

In addition, the luminaire has a reflector 5 that is arranged adjoining the second main surface 32. The reflector 5 is preferably fashioned to be highly reflective. This allows any luminous flux losses as a result of absorption of the light to be kept particularly low. The reflector 5 is first of all used to direct a proportion of the light that emerges from the light guide plate 3 upward, that is to say through the second main surface 32, back into the light guide plate 3 again.

FIG. 2 indicates the described design in the perspective view in the style of an exploded illustration, the reflector 5 being shown in a manner separated from the light guide plate 3. In the assembled state, the reflector 5 is arranged adjoining the light guide plate 3, as shown in FIG. 1. Preferably, the reflector 5 is fashioned in plate-shaped form and arranged plane parallel to the light guide plate 3.

The reflector 5 has at least one transparent region 51 that is fashioned such that a further portion of the light for producing the indirect lighting I is emitted through the transparent region 51 via the second main surface 32, as indicated schematically in FIG. 2 using three further exemplary light beams i1, i2, i3. The transparent region 51 is preferably a recess or through-opening in the reflector 5. This allows the transparent region 51 to be manufactured in a particularly simple manner.

The fashioning of a plurality of corresponding through-openings allows practically arbitrarily precise stipulation or regulation of what proportion of the light produced by the LED light source 2 is intended to be used for producing the indirect lighting I, since there is a proportional ratio between the size of the through-openings and the quantity of indirect light. In particular, the number of through-openings can be chosen as appropriate for this purpose, and the forms of said through-openings can be stipulated in a suitable manner. Preferably, the reflector 5 is perforated for this purpose, that is to say provided with corresponding through-openings at the same distance and of the same size, for example. Hence, there is particularly no need for a separate light source for producing the indirect lighting.

For the purpose of coupling out the light or the "portion" of the light via the first main surface 31 in order to produce the direct lighting D, the light guide plate 3 preferably has structure elements 4 on its second main surface 32. The structure elements 4 thus deflect light beams of the light, so that they can leave the light guide plate 3 as the process continues. This allows an increase in the efficiency of light emission downward, as already known per se from the prior art.

If said structure elements 4 are fashioned such that they extend uniformly over the second main surface 32, the effect achieved in this case is that those points at which the through-openings in the reflector 5 abutt the light guide plate 3 are identifiable through reduced light emission, that is to say dark spots or dark points, when viewing the first main surface 31 of the light guide plate 3. The appearance of the luminaire in the "direct proportion" is therefore altered. This is shown in FIG. 3, which shows a corresponding view of the first main surface 31 of the light guide plate 3 as an example of this instance. The dark points arise because the light is coupled out upward there, that is to say via the second main surface 32 of the light guide plate 3, and the reflector 5 has the through-openings there.

This effect is generally not desirable, however. Rather, it is normally desirable for the light guide plate 3 to have uniform luminosity when viewed. In other words, the most homogeneous possible light emission over the entire first main surface 31 is usually desirable.

The formation of said dark spots can be countered by virtue of the structure elements 4—as shown by way of example in FIG. 6—being fashioned differently within a surface region 41 of the second main surface 32 that is bounded by a normal (or vertical) projection of the transparent region 51 of the reflector 5 than in immediate surroundings 42 of this surface region 41. In particular, the structure elements 4, within the surface region 41 preferably to this end, have a greater density than in the immediate surroundings 42. As a result, it is possible to increase the proportion of the downwardly directed light in the relevant regions, with partial emission of the light upward taking place in order to produce the indirect lighting I. The greater density of the structure elements 4 in the relevant regions can advantageously be produced in a simple manner by additional engravings, for example.

FIG. 4 shows a case in which the structure elements 4 at the relevant points have increased density, produced in this case by additional engraving. It can be seen that the locations of the through-openings in the case shown here are no longer identifiable as dark points, but rather appear somewhat brighter than the surroundings thereof.

Therefore, suitable fashioning of the structure elements 4 allows the points at which the through-openings are situated to be practically no longer identifiable. This is illustrated by means of FIG. 5. In this case, it is first of all possible to identify two locations L1 at which the position of the through-openings can be identified from dark points. At a further location L2, the engraving density is chosen to be excessively high, so that this location L2 appears brighter than the surroundings thereof. At yet a further location L3, the engraving density is chosen to be excessively low, so that this location L3 appears darker than the surroundings thereof. Furthermore, at a location L4, the engraving density is chosen to be as good as optimum, so that the luminosity of this location L5 is practically no different than that of its surroundings, that is to say that said location is therefore practically unidentifiable.

Thus, two effects arise that ideally compensate for one another: (i) coupling-out into the indirect proportion through the open reflector 5 and (ii) amplified coupling-out into the direct proportion for increased density of the engraving.

Accordingly, the structure elements 4 within the surface region 41 are preferably fashioned such that this prompts that portion of the light that is emitted via the first main surface 31 in order to produce the direct lighting D to be emitted homogeneously within a normal projection of the surface region 41 and the immediate surroundings 42.

In this way, the locations of the through-openings in the reflector 5 can be as good as concealed and it is possible to achieve particularly homogeneous light emission over the entire first main surface 31 of the light guide plate 3.

As is the case in the example shown, the luminaire preferably has a plurality of pairs comprising, in each case, a similarly fashioned transparent region 51, 51' of the reflector 5 and an accordingly corresponding, similarly fashioned surface region of the first main surface 31. This allows the emission of the light for producing the indirect lighting I to be controlled in a particularly suitable manner.

Preferably, the through-openings in the reflector 5 are formed, as already mentioned above, by a perforation in the reflector 5.

With further preference, the structure elements 4 are fashioned on the basis of their distance from the LED light source 2, particularly are fashioned more densely as distance increases. As a result, it is possible for the light emission via the first main surface 31 to be effected regardless of the distance from the LED light source 2, as is known as such from the prior art.

As already mentioned, the structure elements 4 may particularly advantageously be formed by engravings, particularly by means of laser treatment. By way of example, the structure elements 4 may be formed by linear elements, wherein the linear elements preferably have a width of between 0.2 mm and 1.5 mm, particularly of between 0.6 mm and 1.0 mm, for example 0.8 mm. These specific values have been found to be particularly suitable in practice in terms of the effects described here. The structure elements 4 may therefore be a grid or a grid structure, for example. The grid may be a square grid; more generally, however, the structure elements 4 may also be, by way of example, lines, triangular grids, two-dimensional engravings, etc.

The transparent region 51 or the through-opening can have a diameter of between 5 and 50 mm, for example.

There are a plurality of size parameters that influence one another. The larger the through-opening in the reflector 5, the more densely the structure elements 4 or the grid need(s) to be chosen for concealment. The width of the grid lines likewise influences the efficiency of the concealment. The aforementioned values have been found to be particularly suitable in this regard.

As mentioned above, the luminaire may be a suspended luminaire, for example. However, it may also be a floor luminaire, for example.

Preferably, the luminaire is fashioned such that the ratio between the luminous flux that is formed by the luminaire as a result of the further portion of the light for producing the indirect lighting I and the total luminous flux, which is formed by the total light emitted by the luminaire, is greater than 10%. This corresponds to a conventional definition for a luminaire for producing direct lighting and indirect lighting. However, it is also possible for the indirect proportion to be lower, for example 4% to 5%, in order to attain light effects, such as a corona effect.

The luminaire according to the invention allows fashioning with a low physical height given comparatively simple design. Attaining the indirect lighting requires no separate light source in this case.

The invention claimed is:

1. A luminaire for producing direct lighting and indirect lighting comprising:
  an LED light source for producing a light,
  a light guide plate having a planar first main surface and a parallel planar second main surface having structure elements formed therein, the first and second main surfaces connected via a narrow lateral face, wherein the LED light source is arranged such that the light is radiated into the light guide plate via the narrow lateral face and subsequently a portion of said light is emitted via the structure elements through the second main surface, and
  a reflector that is arranged plane parallel to and adjoining the second main surface, wherein the reflector has at least one transparent region that is designed such that a portion of the light is emitted through the transparent region via the second main surface producing indirect lighting, wherein the reflector has a reflective region reflecting light emitted via the structure elements back into and through the guide plate to exit the first main surface producing direct lighting, wherein the second main surface comprises a surface region that is in alignment with the transparent region of the reflector, wherein a portion of the structure elements are located within the surface region and are fashioned differently than a portion of the structure elements in immediate surroundings thereof which are in alignment with the reflective region, the structure elements in the surface region have a greater density than the structure elements in the immediate surroundings thereof, wherein the structure elements are engraved into the light guide plate, wherein the structure elements in the surface region in alignment with the transparent region of the reflector are produced by additional engravings, and wherein the structure elements within the surface region are fashioned in such a way that prompts a portion of the light that is emitted via the first main surface in order to produce the direct lighting to be emitted homogeneously within a normal projection of the surface region and the immediate surrounding surface region.

2. The luminaire as claimed in claim 1, wherein the transparent region is formed by a through-opening in the reflector.

3. The luminaire as claimed in claim 1, in which the structure elements are laser engraved into the light guide plate.

4. The luminaire as claimed in claim 3, in which the structure elements form a plurality of predetermined surface regions having a generally oval shape.

5. The luminaire as claimed in claim 1, which has a plurality of pairs comprising, in each case, a similarly fashioned transparent region of the reflector and an accordingly corresponding, similarly fashioned predetermined surface region of the second main surface.

6. The luminaire as claimed in claim 1, having a plurality of predetermined surface regions in which are fashioned on the basis of their distance from the LED light source, and are fashioned more densely engraved as distance from the LED light source increases.

7. The luminaire as claimed in claim 6, in which the structure elements are laser engraved into the light guide plate.

8. The luminaire as claimed in claim 1, having a plurality of predetermined surface regions that are formed by linear elements, wherein the linear elements preferably have a width of between 0.2 mm and 1.5 mm.

9. The luminaire as claimed in claim 1, in which the transparent region has a diameter of between 5 and 50 mm.

10. The luminaire as claimed in claim 1, in the form of a suspended luminaire or floor luminaire.

11. The luminaire as claimed in claim 1, which is fashioned such that a ratio between a luminous flux that is formed by the luminaire as a result of the portion of the light for producing indirect lighting emitted from the second main surface and a total luminous flux, which is formed by a total of the light emitted by the luminaire from the first main surface and the second main surface, is greater than 4%.

* * * * *